US012342945B1

(12) United States Patent
Johnson

(10) Patent No.: US 12,342,945 B1
(45) Date of Patent: Jul. 1, 2025

(54) CHAIR BASE WITH STORAGE BOWLS

(71) Applicant: Ronald B. Johnson, Honokaa, HI (US)

(72) Inventor: Ronald B. Johnson, Honokaa, HI (US)

( * ) Notice: Subject to any disclaimer, the term of this patent is extended or adjusted under 35 U.S.C. 154(b) by 147 days.

(21) Appl. No.: 18/131,967

(22) Filed: Apr. 27, 2023

(51) Int. Cl.
*A47C 7/62* (2006.01)
*A47B 13/02* (2006.01)
*A47C 7/00* (2006.01)

(52) U.S. Cl.
CPC ............ *A47C 7/622* (2018.08); *A47B 13/023* (2013.01); *A47C 7/004* (2013.01); *A47C 7/006* (2013.01); *A47C 7/626* (2018.08); *A47B 2013/025* (2013.01); *F16M 2200/08* (2013.01)

(58) Field of Classification Search
CPC .... A47C 7/626; E04H 12/22; F16M 2200/08; B62M 1/00; A47B 13/023; A47B 2013/024; A47B 2013/025
USPC ........ 297/188.08, 188.12; 248/519; 280/32.5
See application file for complete search history.

(56) References Cited

U.S. PATENT DOCUMENTS

| | | | |
|---|---|---|---|
| 1,270,976 A | 7/1918 | John | |
| 2,613,735 A * | 10/1952 | Edith | A47C 7/626 |
| | | | 297/188.08 X |
| D169,696 S | 5/1953 | Bies | |
| 5,094,422 A * | 3/1992 | Tiffany | F42B 4/20 |
| | | | 248/346.03 |
| 7,036,886 B2 * | 5/2006 | Benden | A47C 7/004 |
| | | | 297/423.37 |
| 7,452,034 B2 * | 11/2008 | Jung | A47C 7/506 |
| | | | 248/188.7 |
| D591,537 S | 5/2009 | Zhang | |
| 7,597,392 B1 * | 10/2009 | Gilmore | A47C 9/00 |
| | | | 280/47.35 |
| D679,923 S | 4/2013 | Corcorran | |
| 8,534,685 B1 * | 9/2013 | Tohm, Sr. | B60B 33/08 |
| | | | 280/87.051 |

(Continued)

FOREIGN PATENT DOCUMENTS

| | | |
|---|---|---|
| GB | 90026160450006 | 1/2015 |
| GB | 90027278180013 | 6/2015 |
| KR | 3007686120000 | 10/2014 |

OTHER PUBLICATIONS

DNA Motoring Stool, Posted Sep. 6, 2021 [online], [retrieved Oct. 25, 2024]. Retrieved from internet, https://a.co/d/aLexXYD (Year: 2021).

(Continued)

*Primary Examiner* — Rodney B White
(74) *Attorney, Agent, or Firm* — Kenneth C. Booth; Booth Udall, PLC

(57) ABSTRACT

A chair base with a platform, at least one support, at least one void, and at least one bowl. The platform has a flat top surface, a bottom surface opposite the top surface, and a plurality of sides bordering the top surface. Each side may extend downward past the bottom surface and inward toward a center of the platform. The support extends up from the top surface of the platform and is configured to support a seat of the chair above the platform. The void extends through the platform and the bowl is sized and shaped to sit within the void. The bowl has a lip configured to engage with a rim of the void and restrict the bowl from entirely passing through the platform. The bowl may be removable from the void. The platform may be mounted on at least three wheels to mobilize the chair base.

20 Claims, 16 Drawing Sheets

(56) References Cited

U.S. PATENT DOCUMENTS

| | | | |
|---|---|---|---|
| D694,562 S | 12/2013 | Lenterman | |
| 8,807,648 B2 * | 8/2014 | Carroll | A47C 7/62 297/188.08 X |
| 8,915,517 B1 * | 12/2014 | Jacobs | B62J 9/20 297/188.12 X |
| 8,973,926 B1 * | 3/2015 | Lensing | A47C 9/027 280/47.34 |
| D726,986 S | 4/2015 | Hall | |
| 9,254,041 B2 | 2/2016 | Kessler | |
| 9,924,805 B2 * | 3/2018 | Cass | A47C 31/00 |
| D829,031 S | 9/2018 | Izawa | |
| 10,136,737 B2 * | 11/2018 | Cass | A47G 23/0225 |
| 10,918,098 B2 * | 2/2021 | Morehead | A01K 97/22 |
| 10,993,530 B2 * | 5/2021 | Cass | A47B 23/02 |
| 11,470,971 B2 * | 10/2022 | Saad | B60B 33/0068 |
| 11,470,973 B1 * | 10/2022 | Yu | A47C 7/628 |
| 11,612,247 B1 * | 3/2023 | Rusch | A47C 3/24 297/423.12 |
| D1,025,737 S * | 5/2024 | Hu | D6/349 |
| 2011/0316313 A1 | 12/2011 | Gasser | |
| 2012/0205949 A1 * | 8/2012 | Nguyen | A47C 7/62 297/188.08 X |
| 2013/0146739 A1 * | 6/2013 | Zhao | E04H 12/2246 248/519 |
| 2017/0066121 A1 | 3/2017 | Huang | |
| 2020/0329873 A1 | 10/2020 | Sun | |
| 2023/0323697 A1 * | 10/2023 | Audenaerde | E04H 12/2246 248/519 |
| 2024/0156252 A1 | 5/2024 | Cass | |

OTHER PUBLICATIONS

Goplus Mechanic Stool, Posted Oct. 13, 2022 [online], [retrieved Oct. 25, 2024]. Retrieved from internet, https://www.amazon.com/Goplus-Adjustable-Pneumatic-Removable-Universal/dp/B0BJ2HM7P3 (Year: 2022).

PowerSmart Rolling Stool, posting date unavailable [online], [retrieved Oct. 25, 2024]. Retrieved from internet, https://a.co/d/b0900CB (Year: 2024).

* cited by examiner

CHAIR BASE WITH STORAGE BOWLS

TECHNICAL FIELD

Aspects of this document relate generally to a chair base, and more specifically to a chair base with storage bowls.

BACKGROUND

Chairs are used for a variety of activities and the useful features of the chair thus vary depending on what the chair is being used for. In some applications, it is desirable for the chair to be mobile and highly stable while the user moves around. Additionally, the user may desire to store tools, hardware, or other items on the chair so that the items remain with the user if the user moves the chair to a new location.

SUMMARY

Aspects of this document relate to a chair base comprising a planar, polygonal platform having a flat top surface, a bottom surface opposite the top surface, and a plurality of straight sides bordering the top surface, wherein each side extends downward past the bottom surface and inward toward a center of the platform, at least three wheels configured to mobilize the chair base, wherein the platform is mounted on the at least three wheels, a plurality of supports extending up from the top surface of the platform and configured to support a height adjustment mechanism above the platform, the height adjustment mechanism slidably coupled to a post supporting a seat of a chair and configured to control a height of the seat above the platform, a plurality of polygonal voids extending through the platform, each of the plurality of voids positioned equidistantly from the center of the platform, and a plurality of bowls sized and shaped to sit within the plurality of voids, each of the plurality of bowls having a lip configured to engage with a rim of a corresponding void of the plurality of voids and restrict each bowl from entirely passing through the platform, wherein each bowl is removable from the plurality of voids, wherein a total number of the plurality of straight sides of the platform, a total number of the plurality of supports, and a total number of the plurality of voids are equal.

Particular embodiments may comprise one or more of the following features. The top surface of the platform may be textured to increase traction on the top surface. The platform may have a plurality of perforations extending through the platform, wherein each has a maximum dimension within a plane parallel with the top surface that is less than or equal to one inch. The chair base may further comprise a central aperture extending through the center of the platform, the central aperture configured to allow an end of the post to pass through the platform.

Aspects of this document relate to a chair base comprising a planar platform having a flat top surface, a bottom surface opposite the top surface, and a plurality of sides bordering the top surface, wherein each side extends downward past the bottom surface and inward toward a center of the platform, a plurality of supports extending up from the top surface of the platform and configured to support a seat of a chair above the platform, at least three wheels configured to mobilize the chair base, wherein the platform is mounted on the at least three wheels, at least one void extending through the platform, and at least one bowl sized and shaped to sit within the at least one void, the at least one bowl having a lip configured to engage with a rim of the at least one void and restrict the at least one bowl from entirely passing through the platform, wherein the at least one bowl is removable from the at least one void.

Particular embodiments may comprise one or more of the following features. The platform may be polygonal. The chair base may further comprise a height adjustment mechanism affixed to the plurality of supports, wherein the height adjustment mechanism is configured to control a height of the seat of the chair with respect to the platform. The seat of the chair may be mounted on a post, wherein a distance between the seat of the chair and the platform is adjustable, and wherein the chair base further comprises a central aperture extending through the center of the platform, the central aperture configured to allow the post to pass through the platform. The at least one void and the at least one bowl may be a plurality of voids and a plurality of bowls, respectively, and each of the plurality of voids may be positioned equidistantly from the center of the platform. A total number of the plurality of sides of the platform, a total number of the plurality of supports, and a total number of the plurality of voids may be equal. The top surface of the platform may be textured to increase traction on the top surface. The platform may have a plurality of perforations extending through the platform, wherein each perforation of the plurality of perforations has a maximum dimension within a plane parallel with the top surface that is less than or equal to one inch.

Aspects of this document relate to a chair base comprising a platform having a top surface and a bottom surface opposite the top surface, at least one support extending up from the top surface of the platform and configured to support a seat of a chair above the platform, at least one void extending through the platform, and at least one bowl sized and shaped to sit within the at least one void, the at least one bowl having a lip configured to engage with a rim of the at least one void and restrict the at least one bowl from entirely passing through the at least one void.

Particular embodiments may comprise one or more of the following features. The platform may further have a plurality of sides bordering the top surface, wherein each side extends downward past the bottom surface and inward toward a center of the platform. The at least one bowl may be removable from the at least one void. The chair base may further comprise a height adjustment mechanism affixed to at least one support, wherein the height adjustment mechanism is configured to control a height of the seat of the chair with respect to the platform. The at least one void and the at least one bowl may be a plurality of voids and a plurality of bowls, respectively, and each of the plurality of voids may be positioned equidistantly from a center of the platform. A total number of the at least one support and a total number of the at least one void may be equal. The top surface of the platform may be textured to increase traction on the top surface. The platform may have a plurality of perforations extending through the platform, wherein each perforation of the plurality of perforations has a maximum dimension within a plane parallel with the top surface that is less than or equal to one inch.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
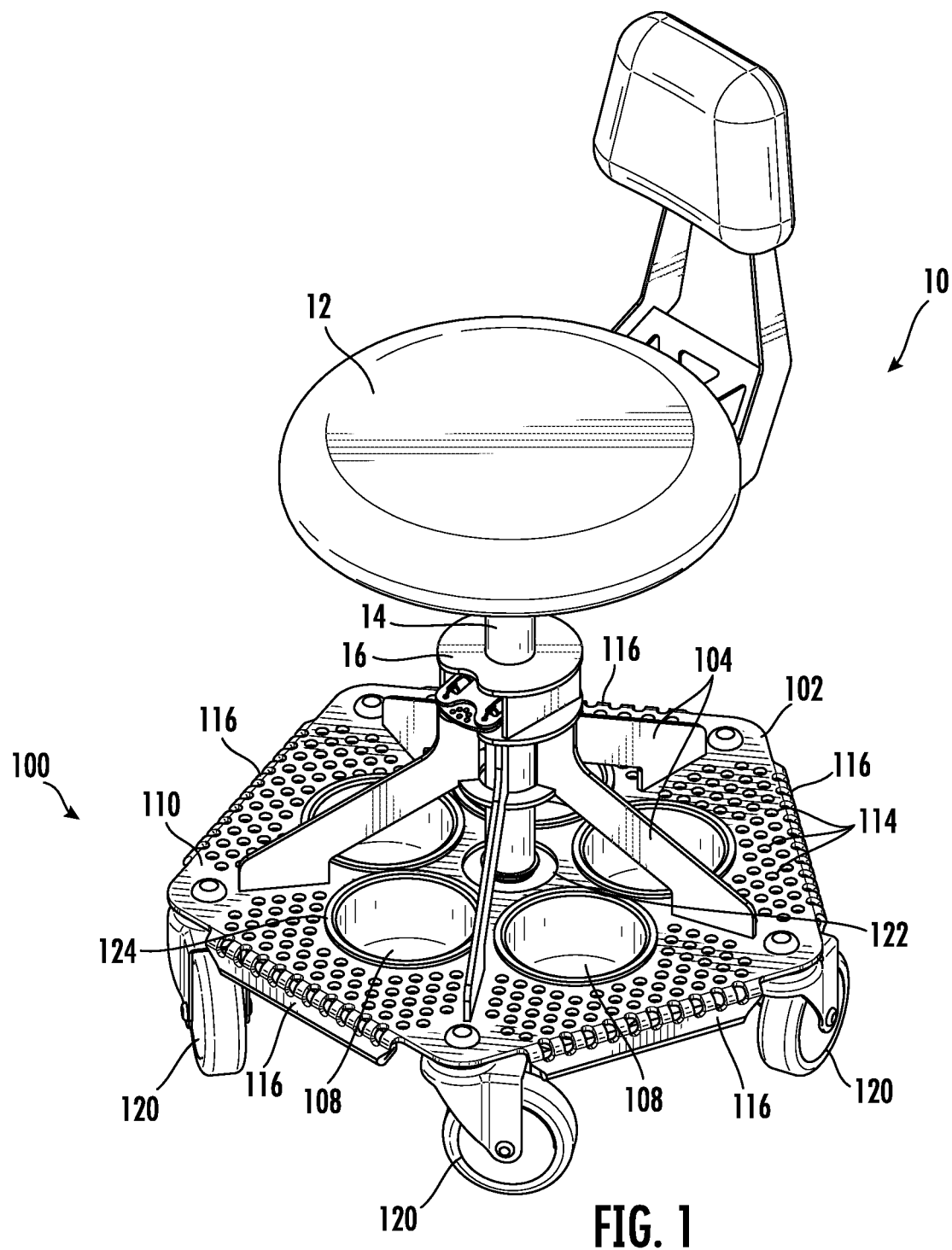
FIG. 1 is a perspective view of a chair with a base.
Figure 2:
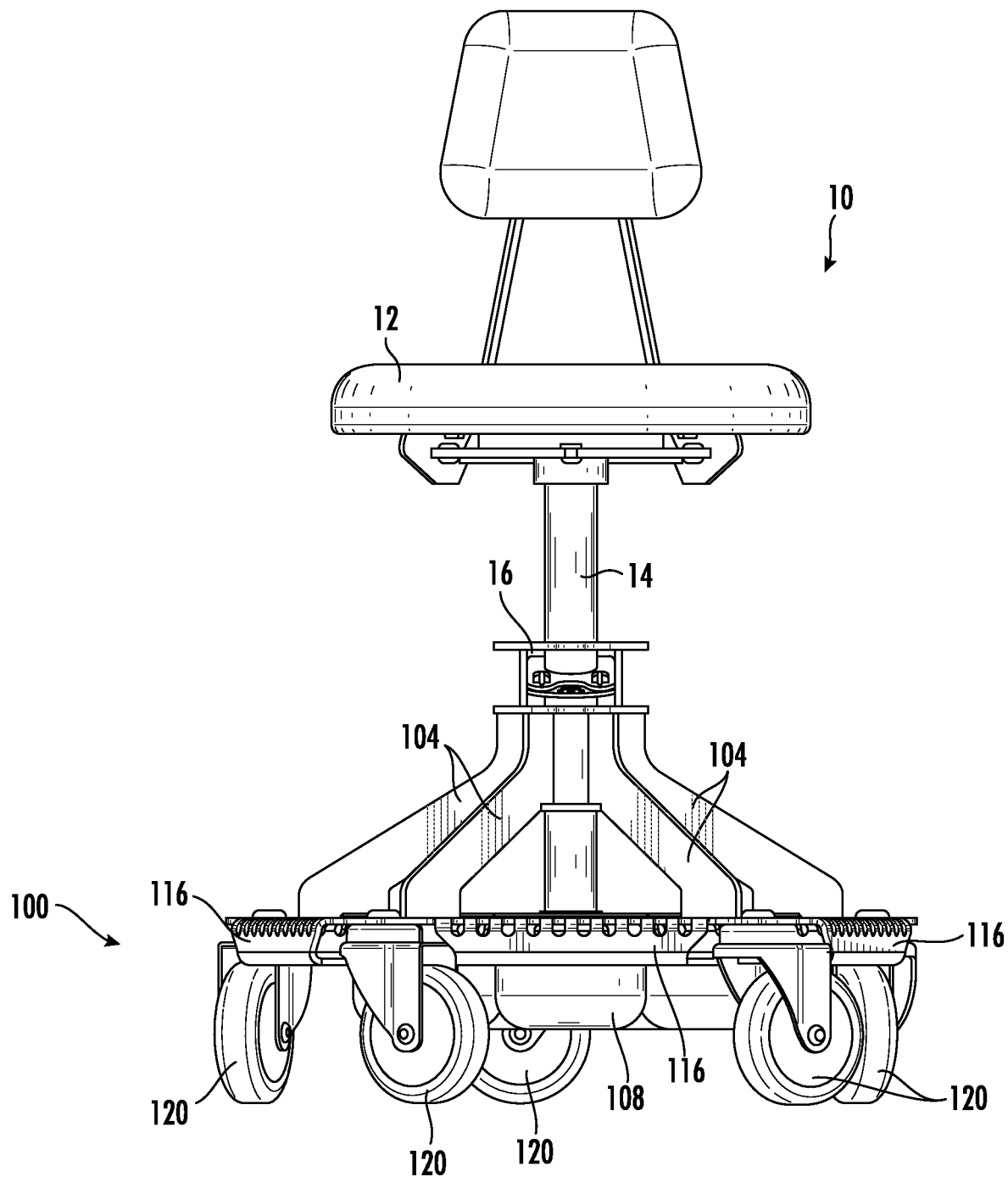
FIG. 2 is a front view of the chair shown in FIG. 1.
Figure 3:
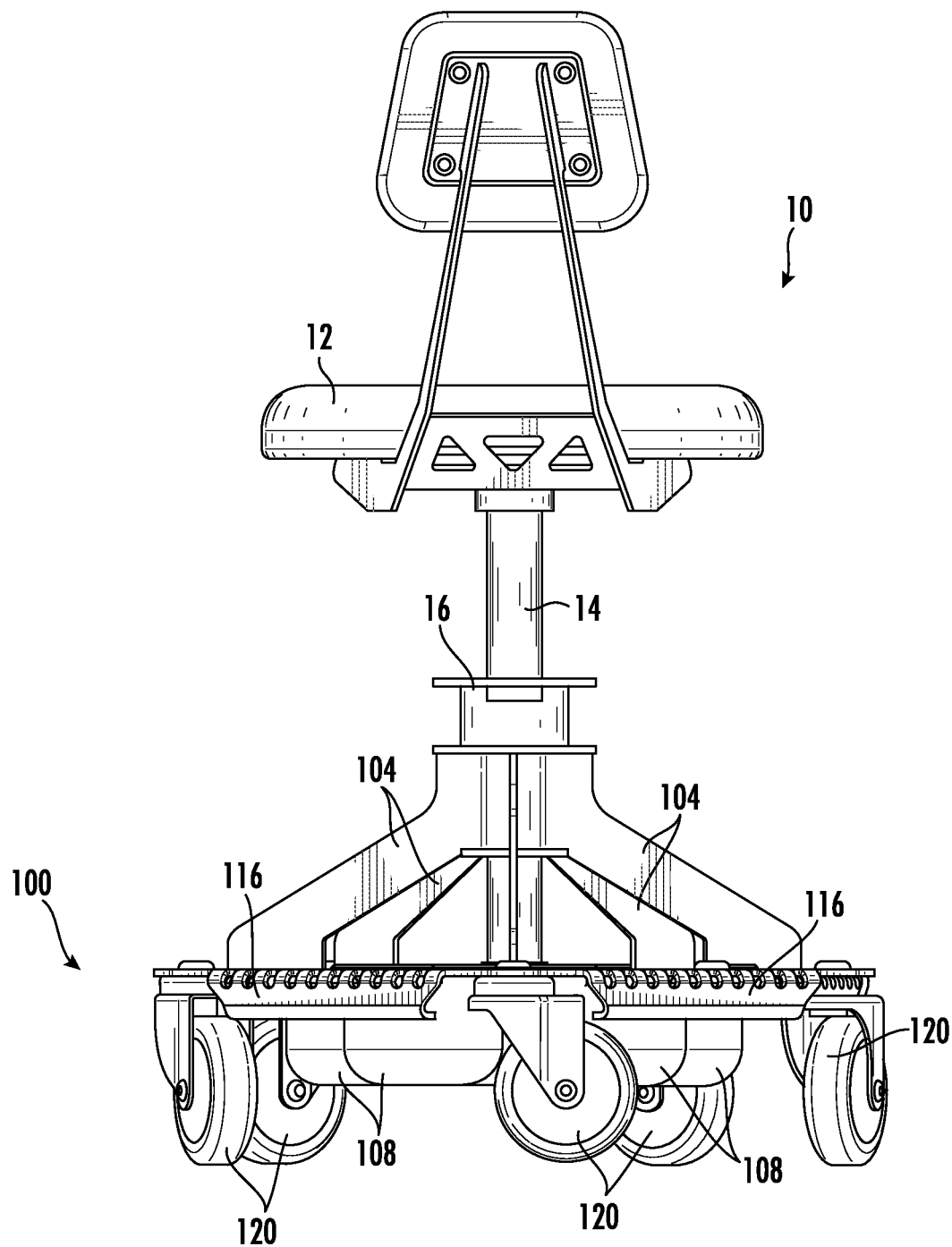
FIG. 3 is a back view of the chair shown in FIG. 1.
Figure 4:
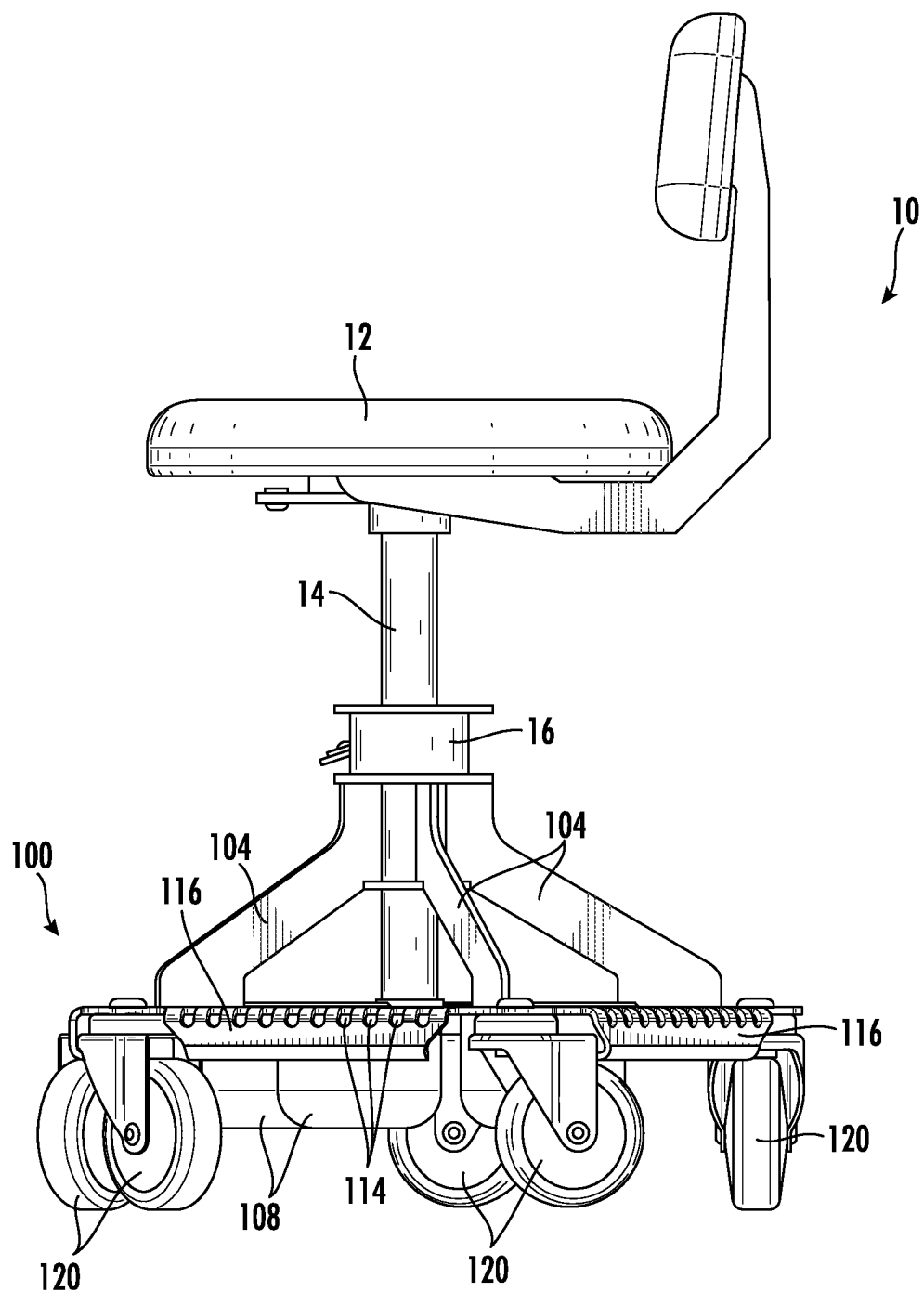
FIG. 4 is a side view of the chair shown in FIG. 1.
Figure 5:
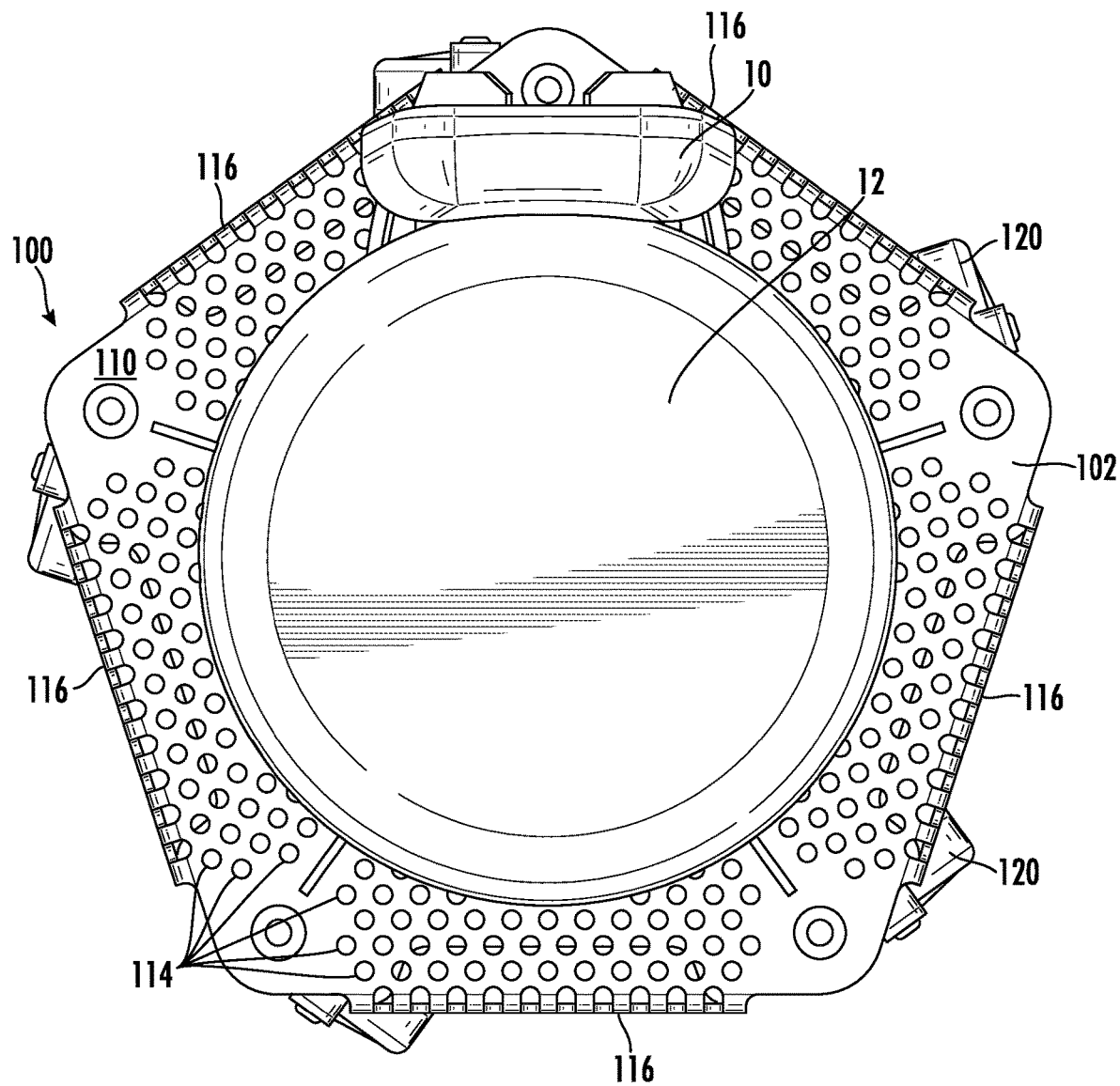
FIG. 5 is a top view of the chair shown in FIG. 1.
Figure 6:
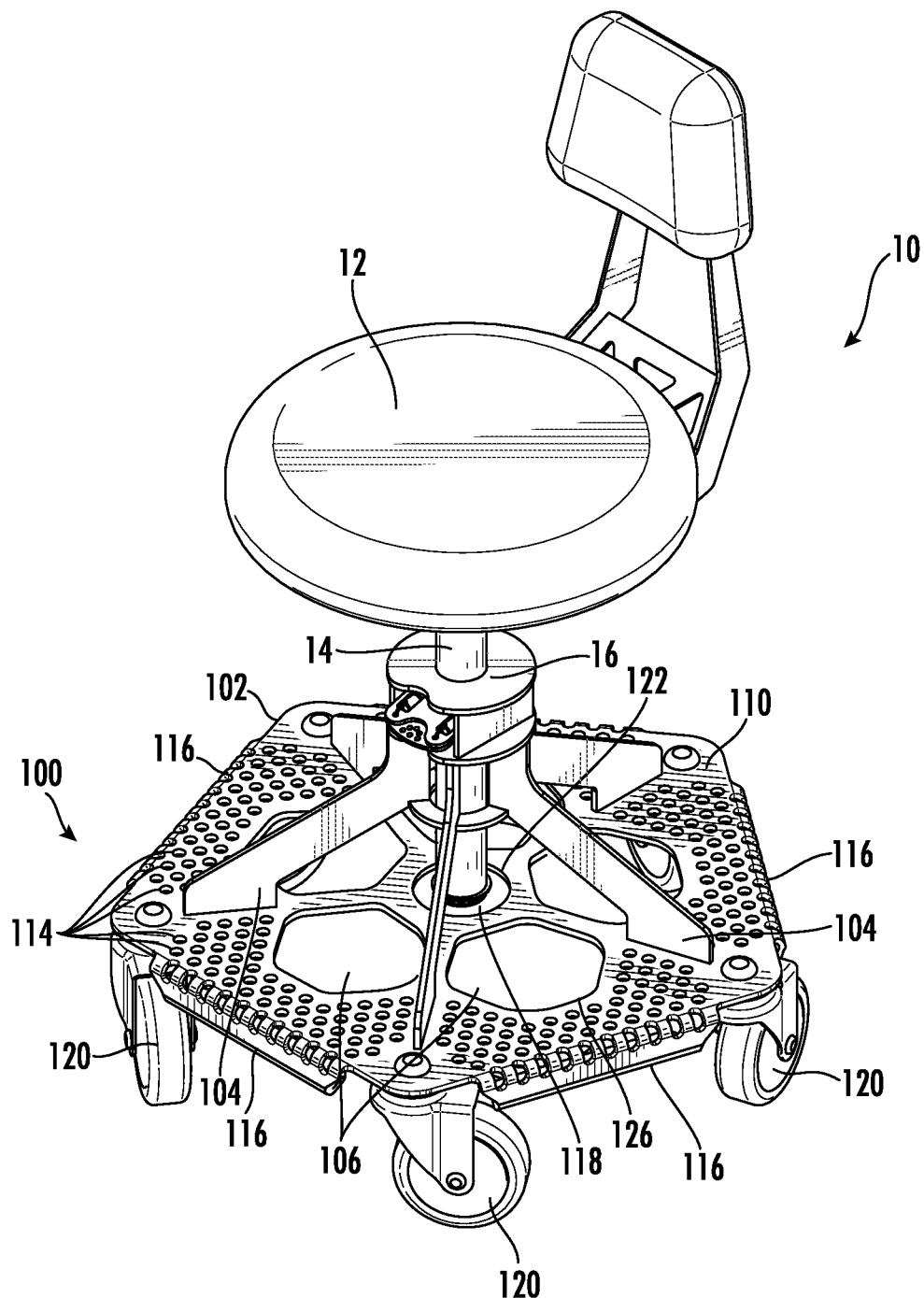
FIG. 6 is a perspective view of the chair shown in FIG. 1 with the storage bowls removed.
Figure 7:
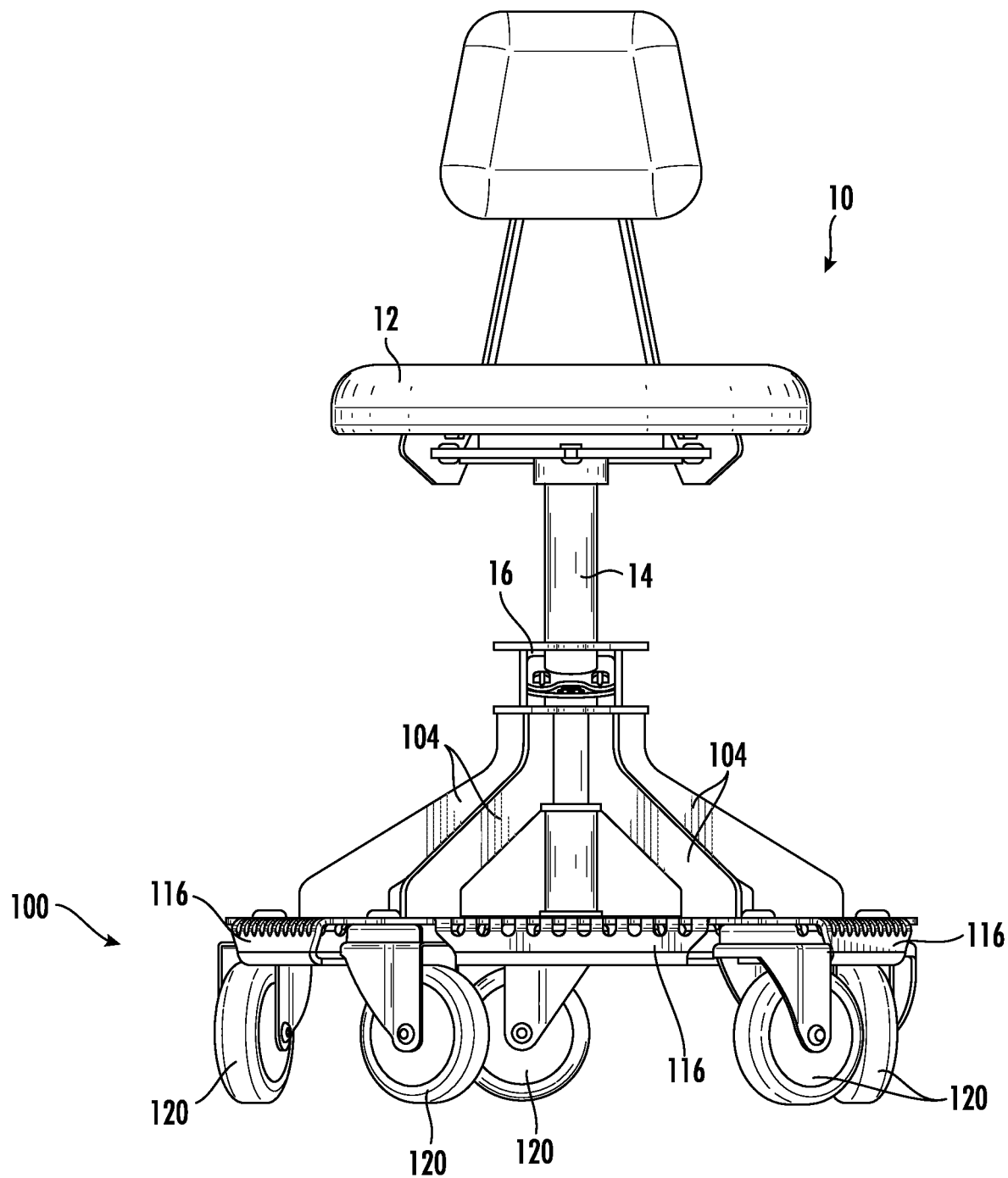
FIG. 7 is a front view of the chair shown in FIG. 6.
Figure 8:
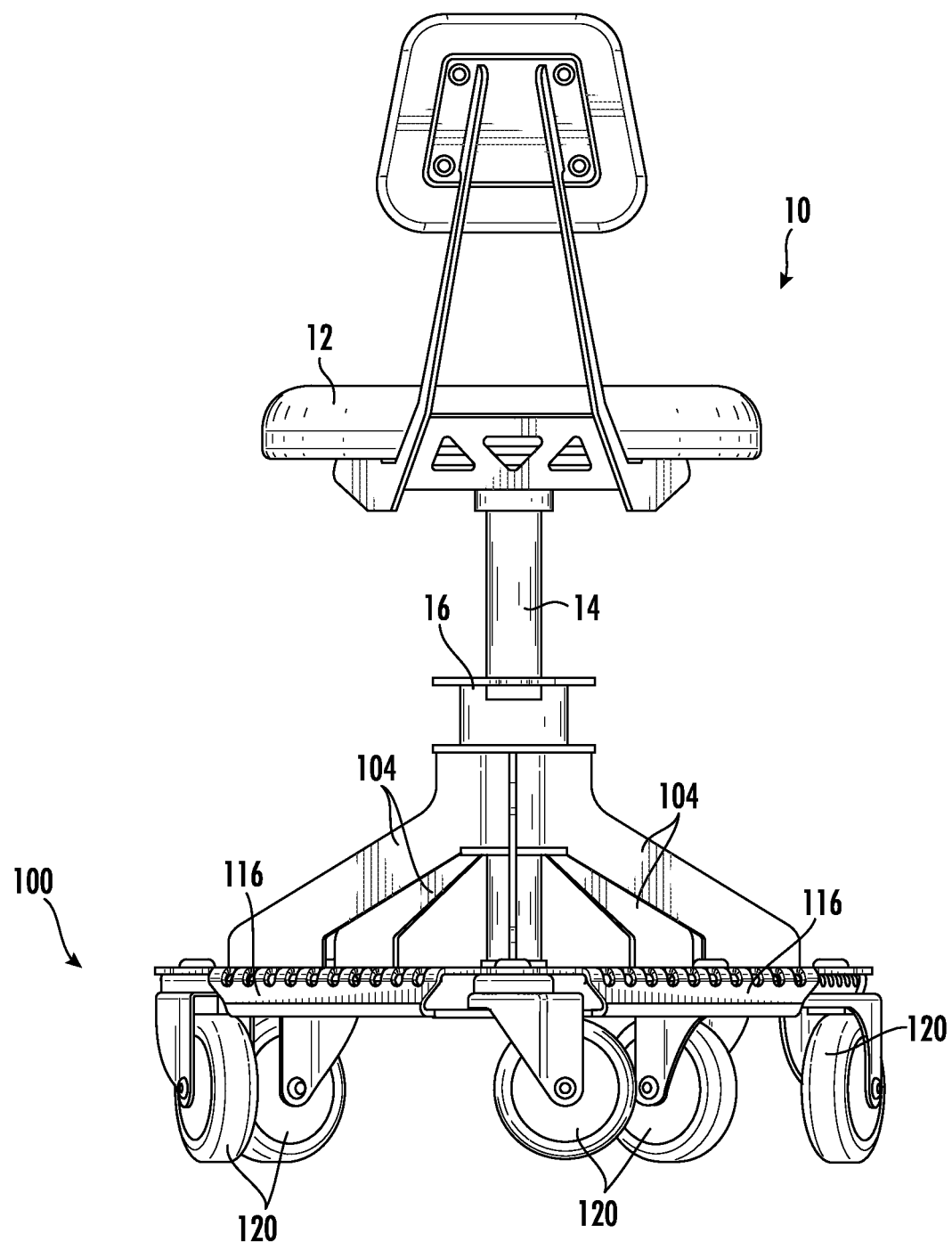
FIG. 8 is a back view of the chair shown in FIG. 6.
Figure 9:
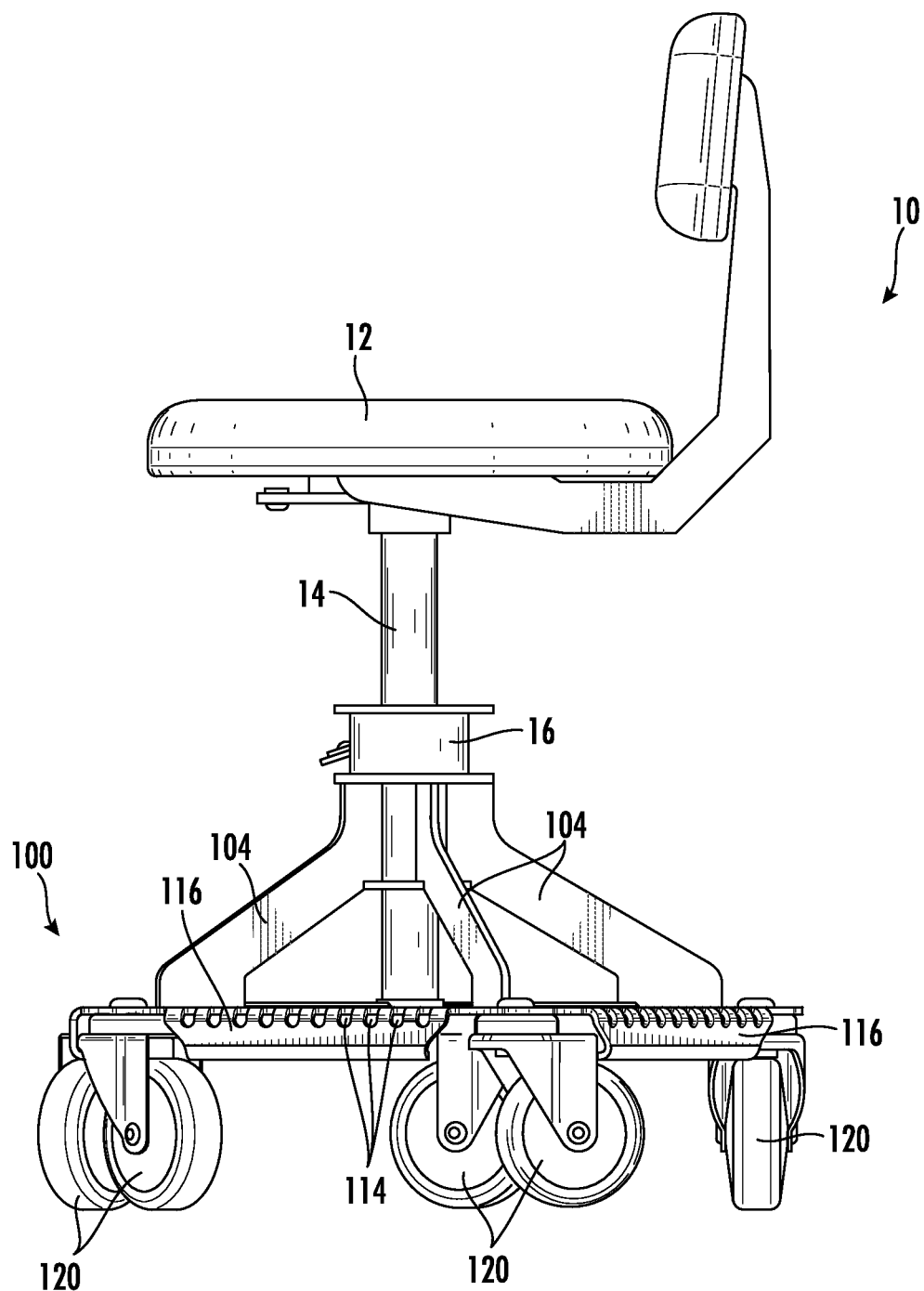
FIG. 9 is a side view of the chair shown in FIG. 6.
Figure 10:
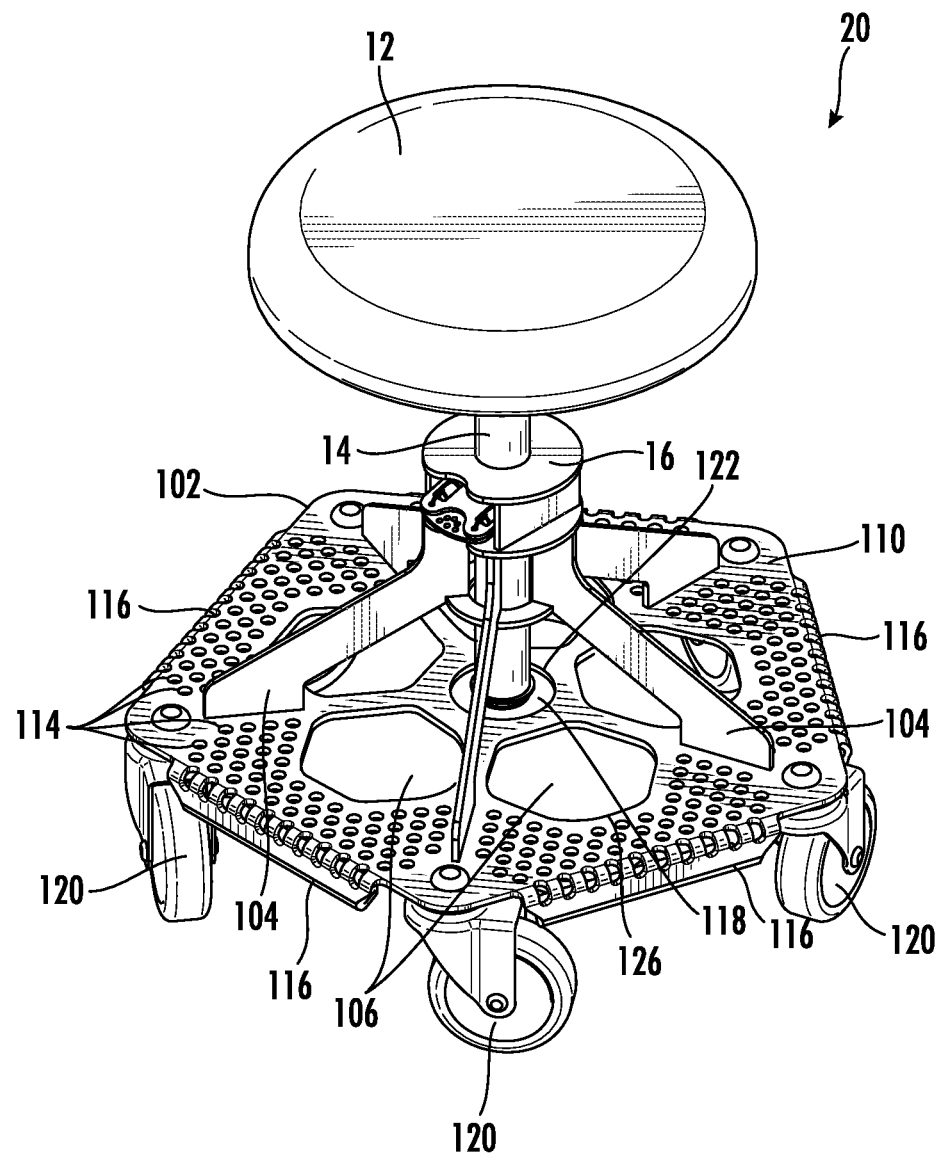
FIG. 10 is a perspective view of a stool with a base.
Figure 11:
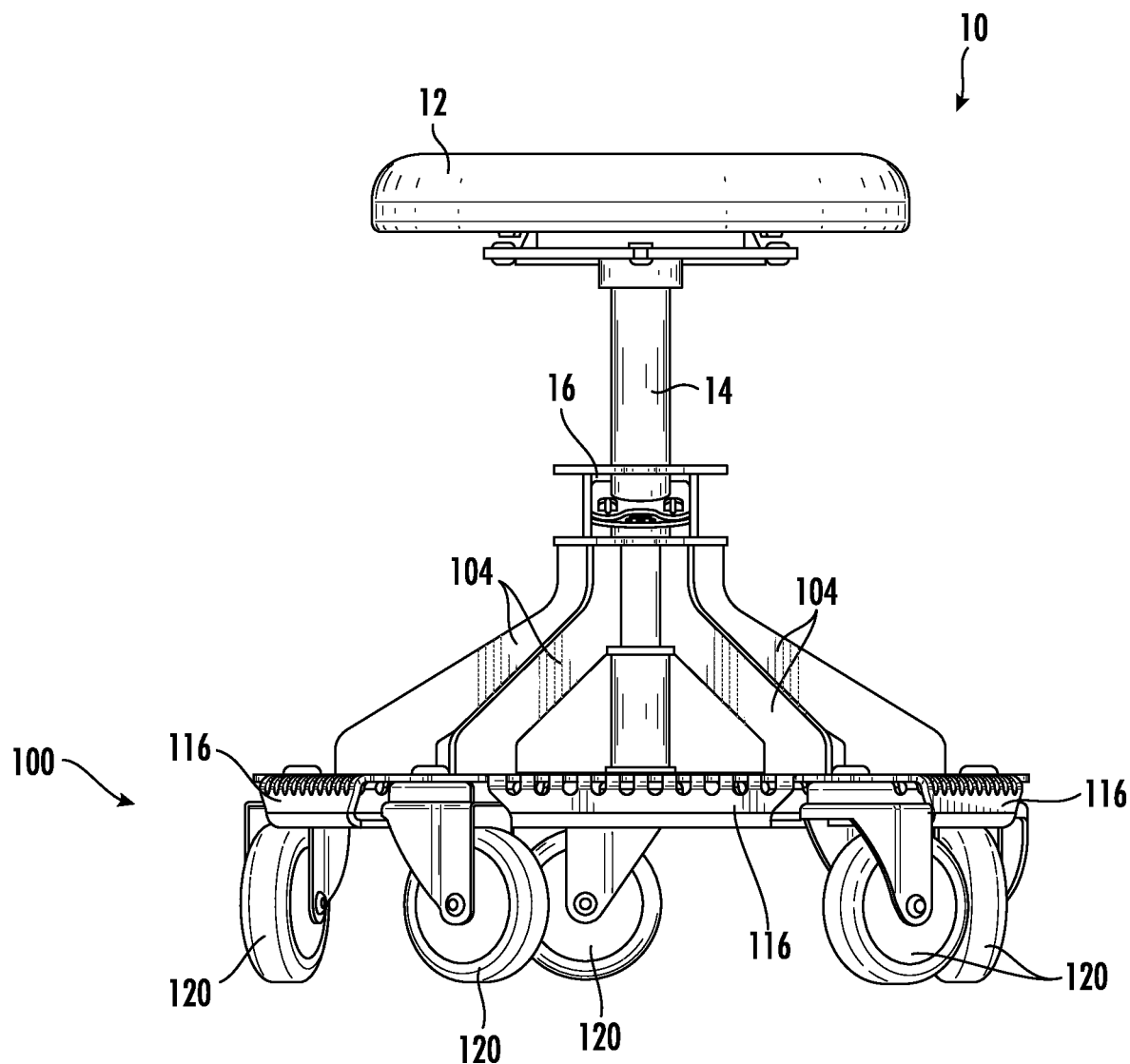
FIG. 11 is a front view of the stool shown in FIG. 10.
Figure 12:
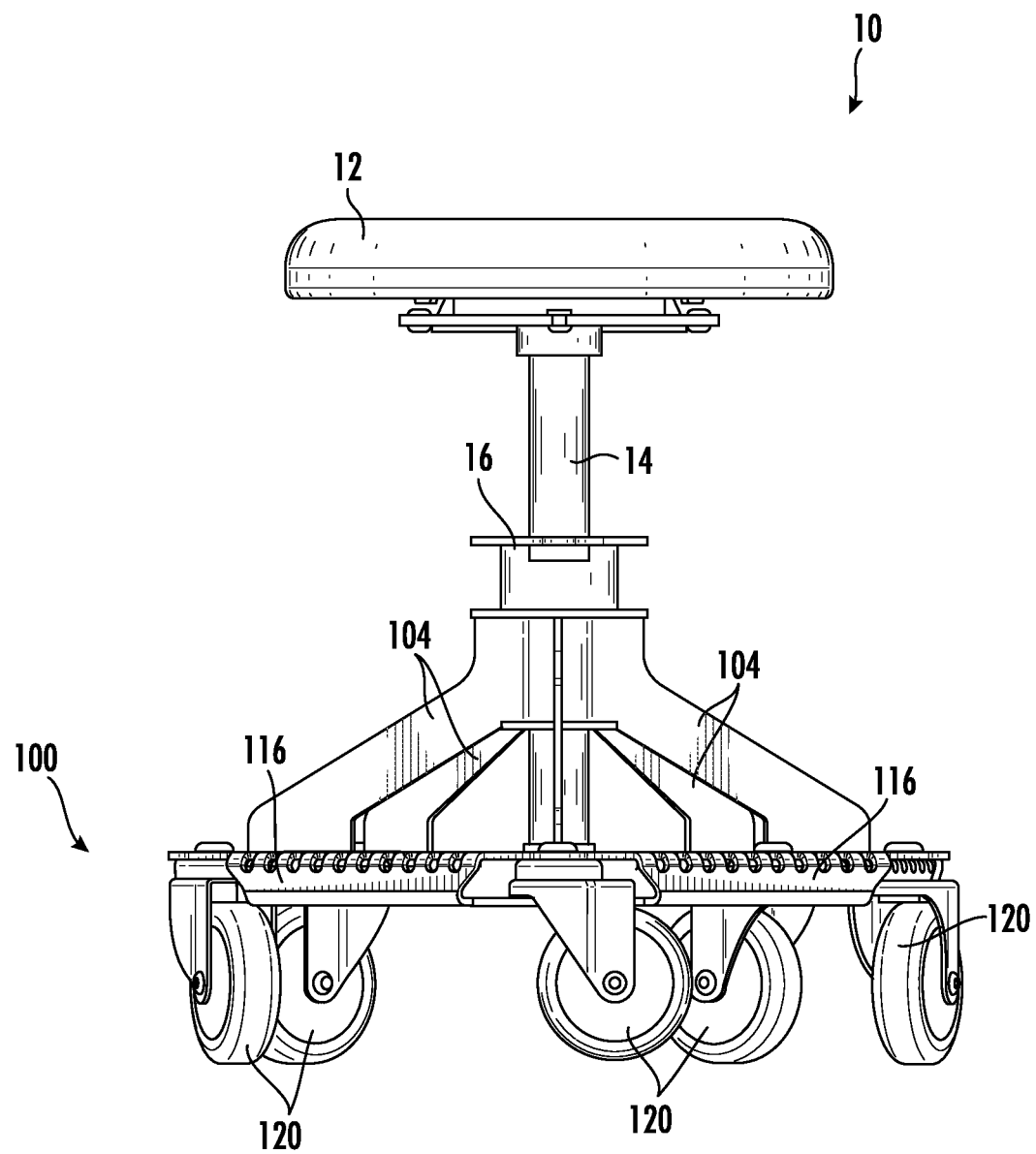
FIG. 12 is a back view of the stool shown in FIG. 10.
Figure 13:
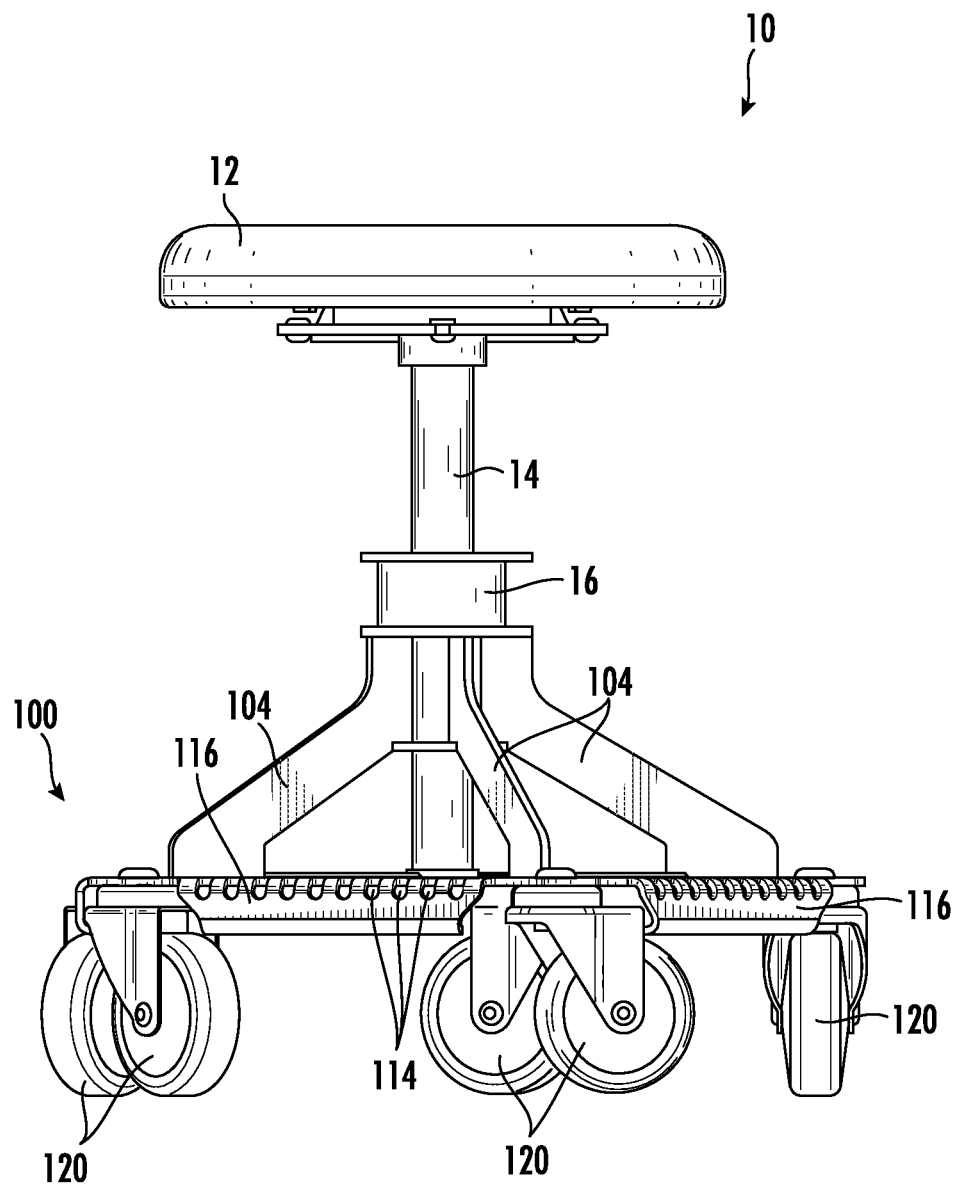
FIG. 13 is a side view of the stool shown in FIG. 10.
Figure 14:
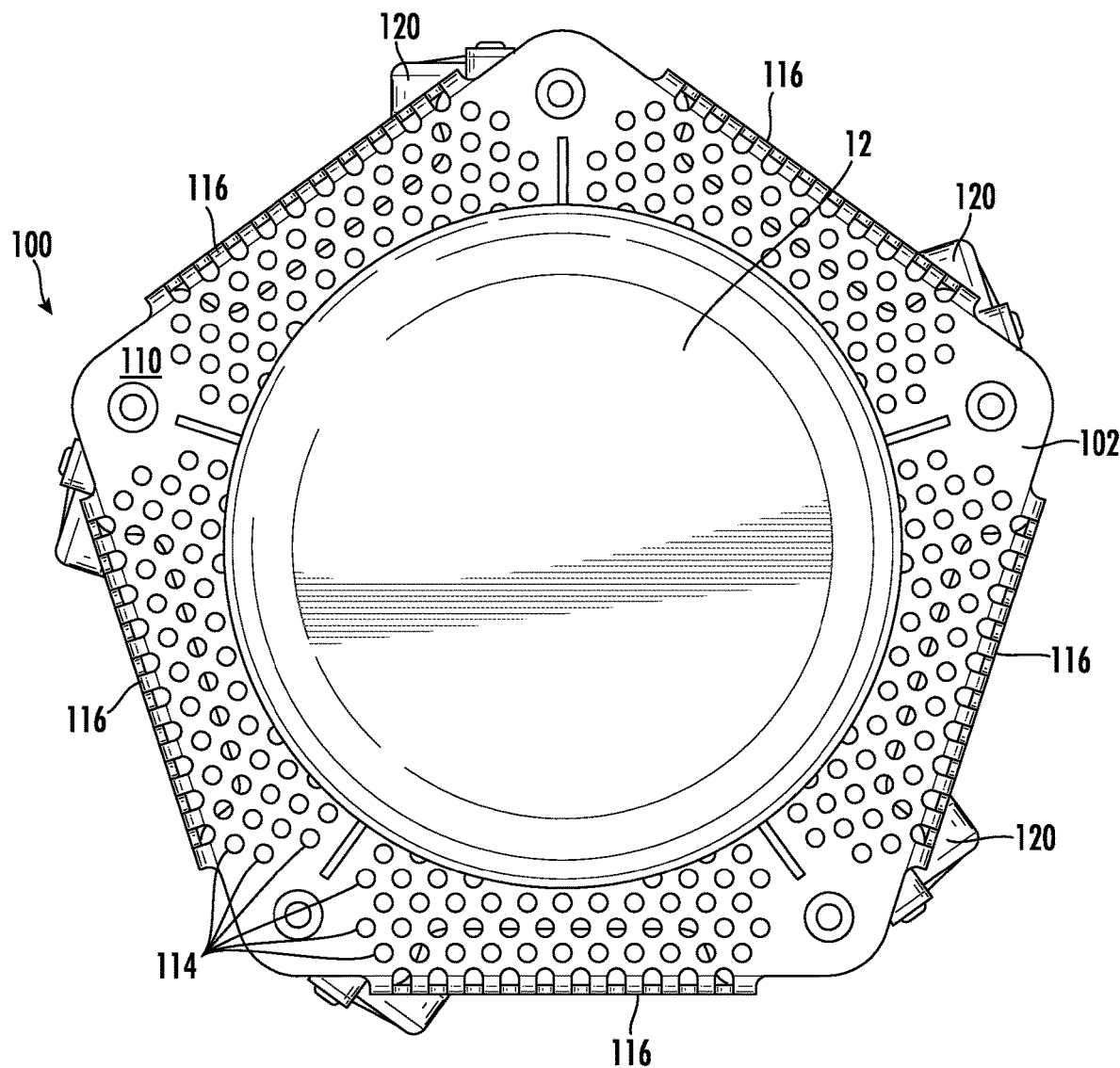
FIG. 14 is a top view of the stool shown in FIG. 10.
Figure 15:
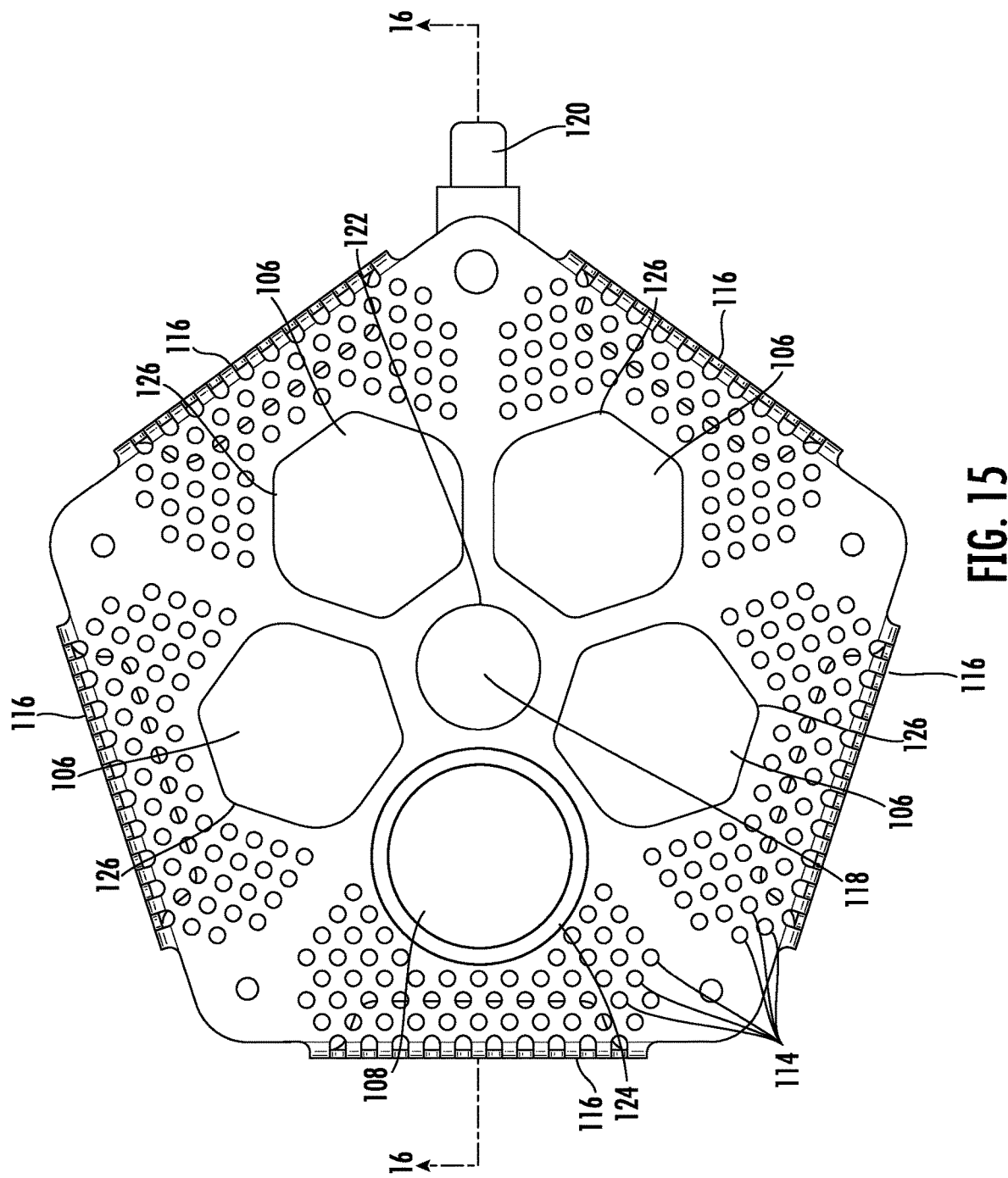
FIG. 15 is a top view of the base of the chair shown in FIG. 1 and the stool shown in FIG. 10.
Figure 16:
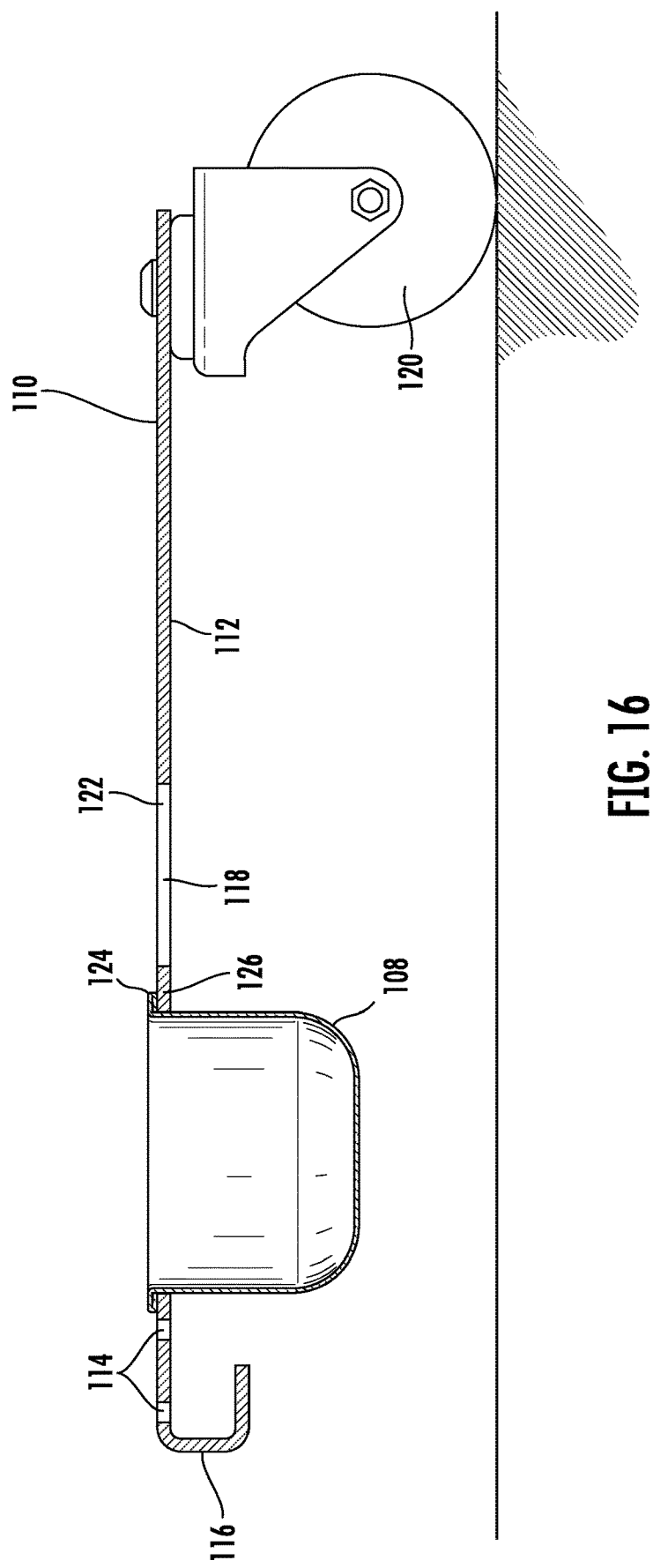
FIG. 16 is a cross section taken along line 16-16 shown in FIG. 15.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a base 100 for a chair 10 or some other seating device, such as a stool 20. Throughout this disclosure, when a chair 10 or a stool 20 is referenced, it is to be understood that any other seating device may be implemented with the base 100 with the same effect. The base 100 comprises a platform 102, at least one support 104 extending up from the platform 102, at least one void 106 extending through the platform 102, and at least one bowl 108 configured to sit within the at least one void 106.

The platform 102 has a top surface 110 and a bottom surface 112 opposite the top surface 110. The platform 102 may be planar, where the top surface 110 is a flat surface. The bottom surface 112 may also be flat and the top surface 110 and the bottom surface 112 may be parallel to each other. In some embodiments, the platform 102 is formed from sheet metal, and thus is a more substantial and continuous surface than is provided by a network of bars or other materials. The top surface 110 of the platform 102 may be textured to increase traction on the top surface 110. This improves the safety of the base 100 by decreasing the likelihood that a user of the chair 10 might slip when supporting some of the user's weight on the base 100.

Similarly, the top surface 110 may have a plurality of perforations 114 or holes extending through the platform that are distinct from the voids 106. The perforations 114 are small enough that the perforations 114 increase traction on the top surface 110 without interfering with the function of the platform 102 as a footrest or chair base. For example, the perforations may have a maximum dimension within a plane parallel with the top surface 110 that is less than or equal to one inch. In some embodiments, this maximum dimension may be less than or equal to ¾ inch or ½ inch.

The top surface 110 of the platform 102 may be bordered by a plurality of sides 116. The sides 116 may be straight, and thus the platform 102 may be polygonal, with straight sides 116 bordering the top surface 110. In some embodiments, the sides 116 are not straight, having a curved path instead. The platform 102 may even by circular, with one curved side. Each of the sides 116 may extend downward from the top surface 110 past the bottom surface 112. In some embodiments, each of the sides 116 additionally extends inward toward a center 118 of the platform 102 such that, at the sides 116 of the platform 102, the platform 102 curves or extends down and underneath the platform 102. The platform 102 may be mounted on wheels 120 that are configured to mobilize the chair base 100. The wheels 120 may be configured to allow the base 100 to move in any direction.

The support 104 may be at least one support 104 or a plurality of supports 104. The support 104 extends up from the top surface 110 of the platform 102 and is configured to support the seat 12 of a chair 10 above the platform 102. In some embodiments, the supports 104 originate within the platform 102. The support 104 may have any cross-sectional shape. In some embodiments, the cross section of the support 104 is an elongated rectangle while in other embodiments, the cross section of the support 104 is circular or any other shape.

The seat 12 may be mounted on a post 14. The post 14 may be directly attached to the supports 104 or may be movably coupled to the supports 104 through a height adjustment mechanism 16. The height adjustment mechanism 16 may be movably or slidably coupled to the post 14 and is configured to control a height of the seat 12 above the platform 102. Thus, the post 14 and the seat 12 may be raised and lowered using the height adjustment mechanism 16. An example of a height adjustment mechanism 16 can be found in U.S. patent application Ser. No. 18/128,014, filed on Mar. 29, 2023, by Ronald B. Johnson, the disclosure of which is hereby incorporated herein by this reference. The platform 102 may have a central aperture 122 extending through the center 118 of the platform 102. The central aperture 122 is configured to allow the post 14 to pass through the platform 102. Thus, the central aperture 122 is sized and shaped so that the post 14 fits through the central aperture 122. This allows the seat 12 to have a greater range of motion between a maximum height above the platform 102 and a minimum height above the platform 102 because the platform 102 does not interfere with the post 14 as the seat 12 moves to lower heights above the platform 102.

As mentioned above, the at least one void 106 extends through the platform 102 and the at least one bowl 108 is configured to sit within the at least one void 106. The at least one bowl 108 is thus sized and shaped to fit into the void 106. Additionally, the bowl 108 is sized to store tools or parts that may be used by the person sitting in the chair. For example, the bowl 108 may be used to hold a collection of screws or a hand tool. In some embodiments, the void 106 is a plurality of voids 106 and the bowl 108 is a plurality of bowls 108. The plurality of voids 106 may be positioned equidistantly from the center 118 of the platform 102. The voids 106 may be polygonal or any other shape. Similarly, the bowls 108 may be polygonal or any other shape. The voids 106 and the bowls 108 are not necessarily the same shape in a particular embodiment, though they may be. The voids 106 are distinct from the perforations 114 described above both in purpose and size. While the perforations 114 are not configured to receive a bowl 108, the voids 106 are configured to receive a bowl 108. Similarly, while the perforations 114 are small, in many embodiments having a maximum dimension smaller than one inch, the voids 106 are much larger and are configured to allow a majority of the bowl 108 to pass through the platform 102 as described in more detail below.

The bowl 108 may have a depth that is less than a width of the bowl 108, but that is more than half a width of the bowl 108. This limits the likelihood of items within the bowl 108 falling out of the bowl 108 while still keeping the items within the bowl 108 easily accessible by hand. Each of the plurality of bowls 108 has a lip 124 that is configured to engage with a rim 126 of a corresponding void 106. The lip 124 thus is configured to restrict the bowl 108 from entirely passing through the platform 102. Instead, a majority of the bowl 108 passes through the platform 102, and then the lip 124 catches on the rim 126 and the bowl 108 sits within the void 106 as mentioned above. Each bowl 108 may be removable from the corresponding void 106.

In some embodiments, the total number or quantity of each of the sides 116 of the platform 102, the supports 104, the voids 106, and/or the bowls 108 may be equal. For example, a total number of the sides 116 of the platform 102, a total number of the supports 104 on the base 100, and a total number of the voids 106 extending through the platform 102 may be equal. The total number of a component refers to the quantity of that component present in a particular embodiment without excluding any of that component from the count. In some embodiments, there are five sides 116 of the platform 102, five supports 104 on the base 100, and five voids 106 extending through the platform 102.

It will be understood that implementations of a chair base are not limited to the specific assemblies, devices and components disclosed in this document, as virtually any assemblies, devices and components consistent with the intended operation of a chair base may be used. Accordingly, for example, although particular chair bases, and other assemblies, devices and components are disclosed, such may include any shape, size, style, type, model, version, class, measurement, concentration, material, weight, quantity, and/or the like consistent with the intended operation of chair bases. Implementations are not limited to uses of any specific assemblies, devices and components; provided that the assemblies, devices and components selected are consistent with the intended operation of a chair base.

Accordingly, the components defining any chair base may be formed of any of many different types of materials or combinations thereof that can readily be formed into shaped objects provided that the materials selected are consistent with the intended operation of a chair base. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various chair bases may be manufactured using conventional procedures as added to and improved upon through the procedures described here. Some components defining a chair base may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling chair bases are not limited to the specific order of steps as disclosed in this document. Any steps or sequence of steps of the assembly of a chair base indicated herein are given as examples of possible steps or sequence of steps and not as limitations, since various assembly processes and sequences of steps may be used to assemble chair bases.

The implementations of a chair base described are by way of example or explanation and not by way of limitation. Rather, any description relating to the foregoing is for the exemplary purposes of this disclosure, and implementations may also be used with similar results for a variety of other applications employing a chair base.

What is claimed is:

1. A chair base comprising:
a planar, polygonal platform having a flat top surface, a bottom surface opposite the top surface, and a plurality of straight sides bordering the top surface, wherein each side extends downward past the bottom surface and inward toward a center of the platform;
at least three wheels configured to mobilize the chair base, wherein the platform is mounted on the at least three wheels;
a plurality of supports extending up from the top surface of the platform and configured to support a height adjustment mechanism above the platform, the height adjustment mechanism slidably coupled to a post supporting a seat of a chair and configured to control a height of the seat above the platform;
a plurality of polygonal voids extending through the platform, each of the plurality of voids positioned equidistantly from the center of the platform; and
a plurality of bowls sized and shaped to sit within the plurality of voids, each of the plurality of bowls having a lip configured to engage with a rim of a corresponding void of the plurality of voids and restrict each bowl from entirely passing through the platform, wherein each bowl is removable from the plurality of voids;
wherein a total number of the plurality of straight sides of the platform, a total number of the plurality of supports, and a total number of the plurality of voids are equal.

2. The chair base of claim 1, wherein the top surface of the platform is textured to increase traction on the top surface.

3. The chair base of claim 1, wherein the platform has a plurality of perforations extending through the platform, wherein each has a maximum dimension within a plane parallel with the top surface that is less than or equal to one inch.

4. The chair base of claim 1, further comprising a central aperture extending through the center of the platform, the central aperture configured to allow an end of the post to pass through the platform.

5. A chair base comprising:
a planar platform having a flat top surface, a bottom surface opposite the top surface, and a plurality of sides bordering the top surface, wherein each side extends downward past the bottom surface and inward toward a center of the platform;
a plurality of supports extending up from the top surface of the platform and configured to support a seat of a chair above the platform;
at least three wheels configured to mobilize the chair base, wherein the platform is mounted on the at least three wheels;
at least one void extending through the platform; and
at least one bowl sized and shaped to sit within the at least one void, the at least one bowl having a lip configured to engage with a rim of the at least one void and restrict the at least one bowl from entirely passing through the platform, wherein the at least one bowl is removable from the at least one void.

6. The chair base of claim 5, wherein the platform is polygonal.

7. The chair base of claim 5, further comprising a height adjustment mechanism affixed to the plurality of supports, wherein the height adjustment mechanism is configured to control a height of the seat of the chair with respect to the platform.

8. The chair base of claim 5, wherein the seat of the chair is mounted on a post, wherein a distance between the seat of the chair and the platform is adjustable, and wherein the chair base further comprises a central aperture extending through the center of the platform, the central aperture configured to allow the post to pass through the platform.

9. The chair base of claim 5, wherein the at least one void and the at least one bowl are a plurality of voids and a plurality of bowls, respectively, and wherein each of the plurality of voids is positioned equidistantly from the center of the platform.

10. The chair base of claim 9, wherein a total number of the plurality of sides of the platform, a total number of the plurality of supports, and a total number of the plurality of voids are equal.

11. The chair base of claim 5, wherein the top surface of the platform is textured to increase traction on the top surface.

12. The chair base of claim 5, wherein the platform has a plurality of perforations extending through the platform, wherein each perforation of the plurality of perforations has a maximum dimension within a plane parallel with the top surface that is less than or equal to one inch.

13. A chair base comprising:
a platform having a top surface, a bottom surface opposite the top surface, and a plurality of sides bordering the platform, wherein each side extends in a direction perpendicular to the top surface and inward toward a center of the platform;
a plurality of supports extending up from the top surface of the platform and configured to support a seat of a chair above the platform;
at least three wheels configured to mobilize the chair base, wherein the platform is mounted on the at least three wheels;
at least one void extending through the platform; and
at least one bowl sized and shaped to sit within the at least one void, the at least one bowl having a lip configured to engage with a rim of the at least one void and restrict the at least one bowl from entirely passing through the platform, wherein the at least one bowl is removable from the at least one void.

14. The chair base of claim 13, wherein the platform is polygonal.

15. The chair base of claim 13, further comprising a height adjustment mechanism affixed to the plurality of supports, wherein the height adjustment mechanism is configured to control a height of the seat of the chair with respect to the platform.

16. The chair base of claim 13, wherein the seat of the chair is mounted on a post, wherein a distance between the seat of the chair and the platform is adjustable, and wherein the chair base further comprises a central aperture extending through the center of the platform, the central aperture configured to allow the post to pass through the platform.

17. The chair base of claim 13, wherein the at least one void and the at least one bowl are a plurality of voids and a plurality of bowls, respectively, and wherein each of the plurality of voids is positioned equidistantly from the center of the platform.

18. The chair base of claim 17, wherein a total number of the plurality of sides of the platform, a total number of the plurality of supports, and a total number of the plurality of voids are equal.

19. The chair base of claim 13, wherein the top surface of the platform is textured to increase traction on the top surface.

20. The chair base of claim 13, wherein the platform has a plurality of perforations extending through the platform, wherein each perforation of the plurality of perforations has a maximum dimension within a plane parallel with the top surface that is less than or equal to one inch.

* * * * *